United States Patent
Taylor et al.

(10) Patent No.: US 8,907,958 B2
(45) Date of Patent: Dec. 9, 2014

(54) DISPLAY SCREEN SUBSECTION RENDERING APPARATUS AND METHOD

(75) Inventors: Ralph Clayton Taylor, Deland, FL (US); John Carey, Winter Springs, FL (US)

(73) Assignee: ATI Technologies ULC, Markham, Ontario (CA)

(*) Notice: Subject to any disclaimer, the term of this patent is extended or adjusted under 35 U.S.C. 154(b) by 762 days.

(21) Appl. No.: 11/161,660

(22) Filed: Aug. 11, 2005

(65) Prior Publication Data

US 2006/0055701 A1 Mar. 16, 2006

Related U.S. Application Data

(60) Provisional application No. 60/600,870, filed on Aug. 12, 2004.

(51) Int. Cl.
*G06T 1/00* (2006.01)
*G06T 15/00* (2011.01)
*G06T 1/60* (2006.01)

(52) U.S. Cl.
CPC ............... *G06T 1/60* (2013.01); *G06T 15/005* (2013.01)
USPC .......................................... 345/522; 345/502

(58) Field of Classification Search
USPC .................. 345/503, 522, 419, 422; 382/233
See application file for complete search history.

(56) References Cited

U.S. PATENT DOCUMENTS

| | | | | |
|---|---|---|---|---|
| 5,596,686 A * | 1/1997 | Duluk, Jr. | ..................... | 345/422 |
| 6,091,422 A * | 7/2000 | Ouaknine et al. | ............. | 345/419 |
| 6,115,054 A * | 9/2000 | Giles | ............................. | 345/522 |
| 6,147,695 A * | 11/2000 | Bowen et al. | ................. | 345/503 |
| 6,956,579 B1 * | 10/2005 | Diard et al. | .................... | 345/537 |
| 7,015,915 B1 * | 3/2006 | Diard | ............................. | 345/522 |
| 2002/0050990 A1 * | 5/2002 | Sowizral et al. | ............. | 345/421 |
| 2003/0164834 A1 * | 9/2003 | Lefebvre et al. | ............. | 345/506 |
| 2005/0058353 A1 * | 3/2005 | Matsubara | .................... | 382/233 |

* cited by examiner

*Primary Examiner* — Phi Hoang
(74) *Attorney, Agent, or Firm* — Faegre Baker Daniels LLP

(57) ABSTRACT

A method and apparatus for providing rendering of subsections of screen space receives render commands associated with different screen subsections, such as from a command buffer populated by a coprocessor, and determines which screen section is currently being rendered by a rendering engine, or stated another way, which screen section the host processor wishes to have rendered, and evaluates screen subsection data that is associated with a received rendering command. The screen subsection data identifies a screen subsection for which the command refers. The method includes executing the command if it is determined that the command refers to a current screen section being rendered.

6 Claims, 4 Drawing Sheets

DISPLAY SCREEN SUBSECTION RENDERING APPARATUS AND METHOD

RELATED APPLICATIONS

Figure 1:
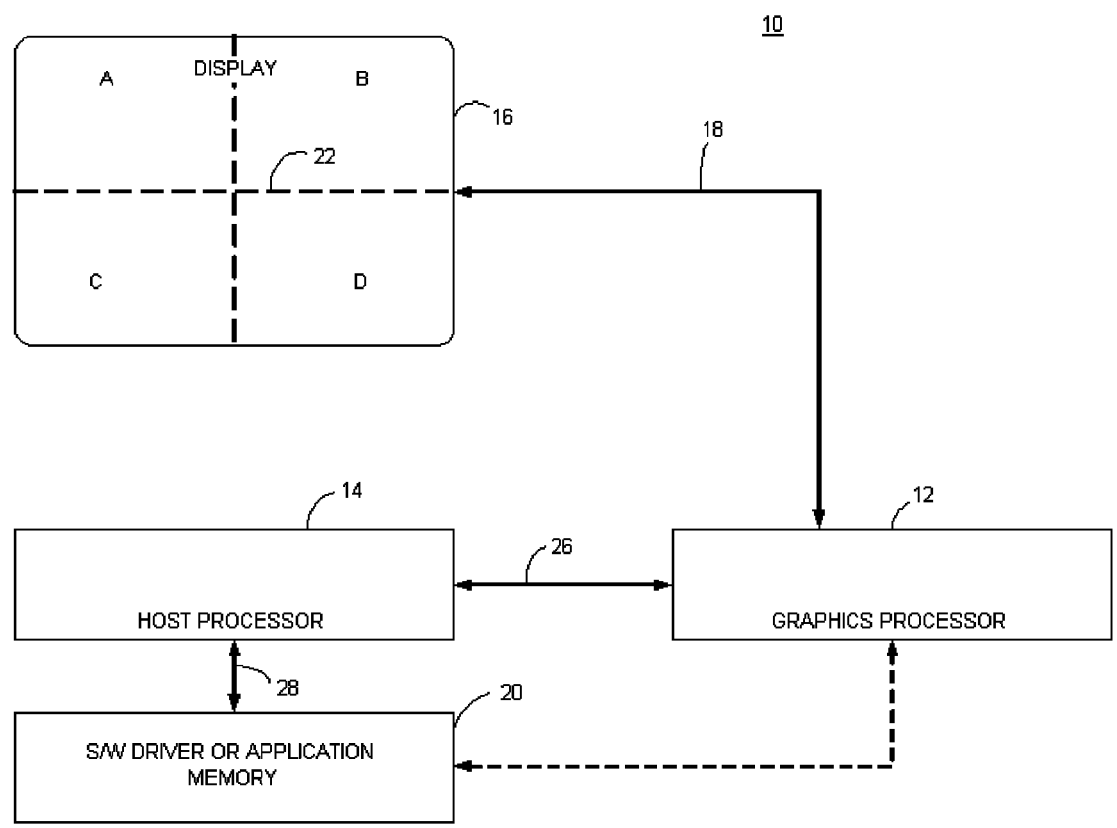

This application claims the benefit of U.S. Provisional Application Ser. No. 60/600,870 filed Aug. 12, 2004, entitled "DISPLAY SCREEN SUBSECTION RENDERING APPARATUS AND METHOD", having as inventors Ralph Clayton Taylor and John Carey, and owned by instant assignee and hereby incorporated by reference in its entirety.

FIELD OF THE INVENTION

The invention relates generally to apparatus and methods that facilitate graphics rendering, and more particularly to methods and apparatus that facilitate display screen subsection rendering.

BACKGROUND OF THE INVENTION

Graphics processing systems are known that break down a display screen into subsections and then render each subsection separately. Where graphic systems employ both a host processor and graphics processor, because the software driver or other application is executing on the host processor, the host processor tends to keep track of which portion of the screen it wants rendered. However, if the host processor needs to rearrange its command list and send only those commands dealing with a currently rendered screen subsection, this can require additional sorting and command jumping that must be carried out by the host processor. This can result in performance degradation and require additional overhead for the host processor.

Another solution may be to render all vertice information for all objects to be rendered for the entire screen and then throw out or discard the fully rendered objects that are not necessary for a given screen subsection. However, such an approach wastes valuable graphics processor resources by requiring all the objects to be rendered and throwing away the objects that are not needed for that particular portion of the screen that is being rendered.

DETAILED DESCRIPTION OF THE DRAWINGS

Figure 2:
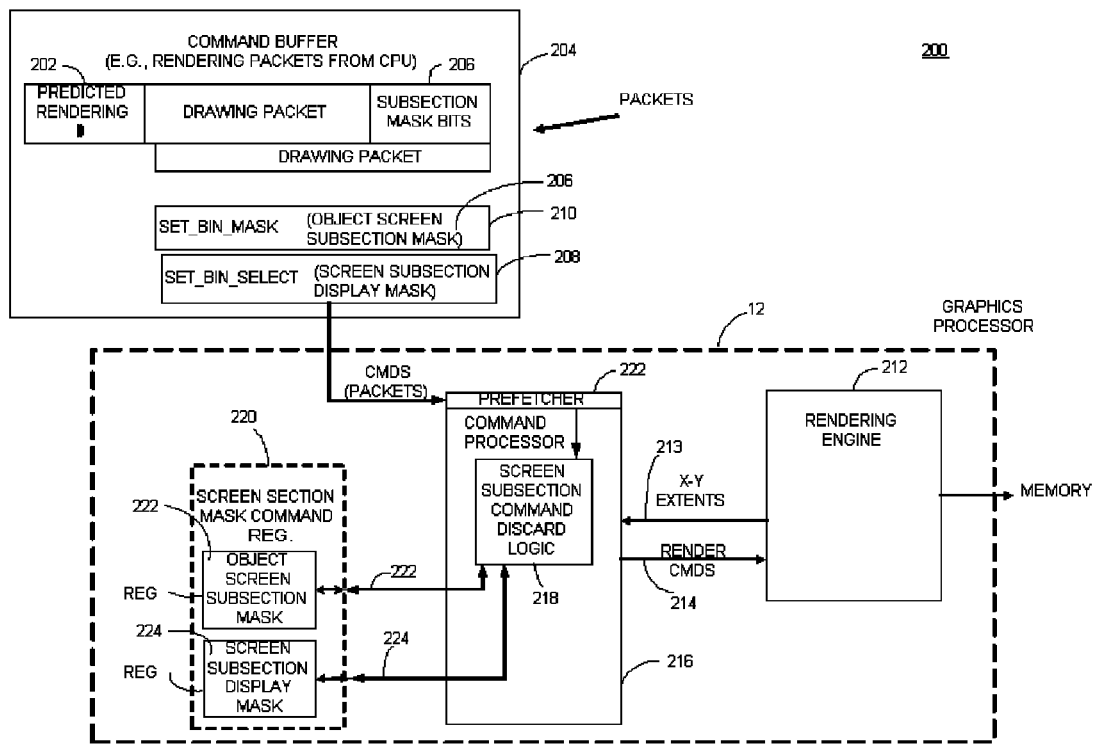
Figure 3:
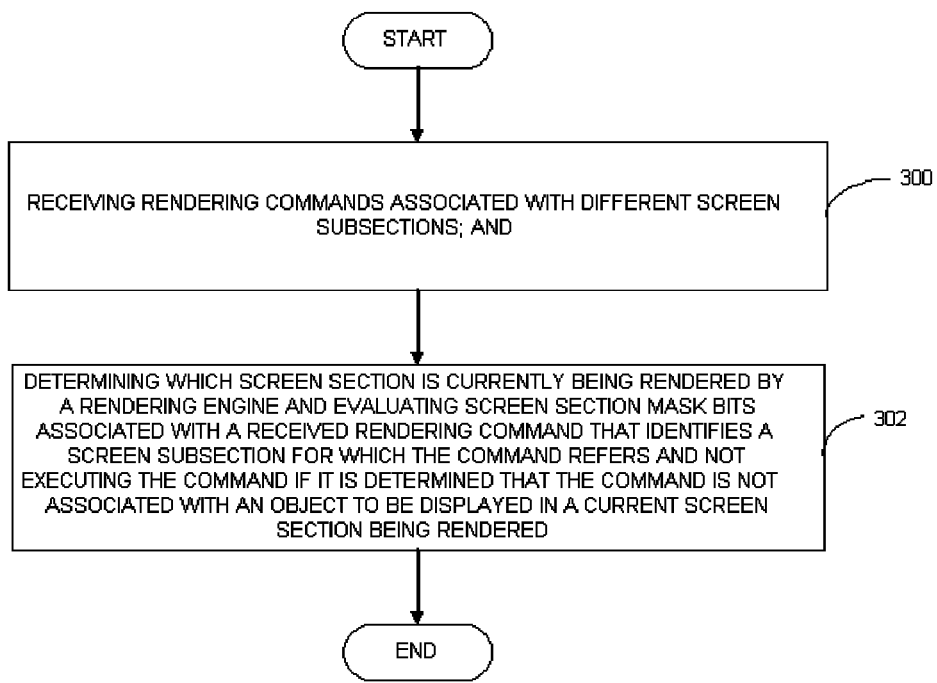
Figure 4:
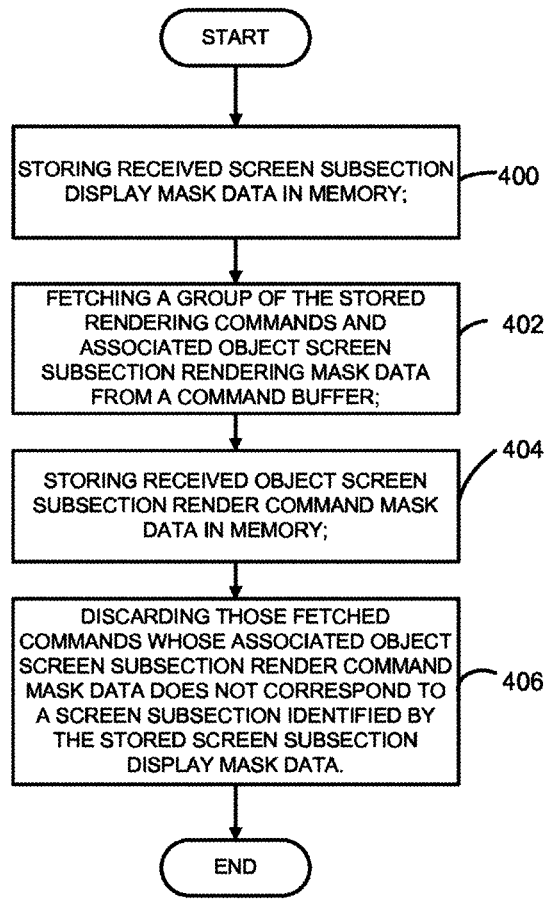

The invention will be more readily understood in view of the following description when accompanied by the below figures and wherein like reference numerals represent like elements:

FIG. 1 is a block diagram illustrating one example of a graphics processor that includes screen subsection command discard in accordance with one embodiment of the invention;

FIG. 2 is a block diagram illustrating one example of a graphics processor that includes screen subsection command discard in accordance with one embodiment of the invention; and FIG. 3 is a flowchart illustrating one example of a method for providing rendering of subsections of a screen space in accordance with one embodiment of the invention; and FIG. 4 is a flowchart illustrating one example of a method for providing rendering of subsections of a screen space in accordance with one embodiment of the invention.

DETAILED DESCRIPTION OF THE PREFERRED EMBODIMENT

Briefly, a method and apparatus for providing rendering of subsections of screen space receives render commands associated with different screen subsections, such as from a command buffer populated by a coprocessor, and determines which screen section is currently being rendered by a rendering engine, or stated another way, which screen section the host processor wishes to have rendered, and evaluates screen subsection data, such as mask bits, that are associated with a received rendering command. The screen subsection data identifies a screen subsection for which the command refers. The method includes not executing the command if it is determined that the command is not associated with a current screen subsection being rendered.

In one embodiment, a command processor includes memory that contains received object screen subsection render command mask data and received screen subsection display mask data. The command processor also includes screen subsection command discard logic operatively coupled to the memory. The screen subsection command discard logic discards fetched commands whose associated object screen render command mask data does not correspond to a screen section identified by the stored screen subsection display mask data. Accordingly, a host processor is allowed to populate a command buffer with rendering commands for any screen subsection and the command processor determines which fetched commands should be executed or discarded if, for example, the commands indicate that they are predicated rendering commands. The predicated rendering may be indicated, for example, by the header in the command packet. If the fetched command is not for an object that has been identified as falling within the screen subsection that the CPU wants rendered currently, the command is discarded and not executed. As such, the CPU may continue to populate the command buffer without having to sort commands for a particular screen section. Other advantages would be recognized by those of ordinary skill in the art.

FIG. 1 illustrates one example of a graphics rendering system 10 that includes a graphics processor 12, a host processor 14, a display device 16 that displays display information output by the graphics processor 12 identified as display information 18, and memory 20, which may contain a software driver or other application that is executed by the host processor 14 and requires the graphics processor 12 to perform some graphics rendering. The display 16 is shown as being divided into display subsections indicated by the dashed line 22. As such, the host processor 14 desires to have subsections of the display rendered as opposed to the entire display being rendered at one time. The graphics processor 12 communicates with the host processor 14 through one or more suitable buses indicated at 26, and the host processor 14 and graphics processor 12 may have access to memory 20 through any other suitable bus or interfaces as desired. In this example, the host processor 14 is shown as accessing memory through a bus or interface 28. However, it will be recognized that any suitable linking may be used. In this example, the graphics processor 12 receives render commands from the host processor 14 by, for example, accessing a suitable command buffer stored in memory 20, resident on the host processor 14, resident on the graphics processor 12, or any other suitable location. The render commands are associated with different screen subsections such as subsection A, B, C or D.

The graphics processor 12 includes suitable logic or may execute a suitable software program stored in memory to determine which screen section is currently desired by the host processor 14 to be rendered by a rendering engine resident on the graphics processor 12. The graphics processor 12 evaluates screen section mask bits that are associated with received rendering commands. For example, rendering commands or a group of rendering commands, or packets, may include one or more bits identifying a screen section A, B or C, wherein the object that is being rendered will be displayed in that particular screen subsection. The graphics processor 12 identifies the screen subsection for which the command refers and does not execute the command if it is determined that the command does not refer to a current screen section being rendered. For example, the graphics processor may discard a fetched command if it is determined that the fetched command is not associated with the current screen section being rendered.

In one example, the host processor may initially provide rendering commands or packets for an entire screen, if desired, or other portion, to the graphics processor 12 or for the graphics processor 12 and have the graphics processor 12 determine where the rendered object would be displayed in screen space. For example, the graphics processor may determine the x-y coordinate of pixels which are affected by a given object and provide the x-y coordinate range of affected pixel information, otherwise referred to as screen extents, back to the host processor. The host processor 14 receives the screen extents for the rendered object and generates object screen subsection render command mask data for rendering commands for the object indicating which screen section or screen sections the object would be displayed in of the plurality of subsections on the screen. For example, for packets in a command stream, a packet such as an object screen subsection mask packet (SET-BIN-MASK) is provided for one or more commands for a given object indicating that that object may appear in both display section B and display section D, or just one of the subsections. In addition, the CPU also indicates which subsection it wants information rendered for and sends a packet containing the selected screen subsection display mask (SET-BIN-SELECT) for the time it wants a certain subsection screen rendered. These screen section mask bits in the packets are then stored in a register by the command processor. As such, the CPU generates screen subsection display mask data indicating which screen subsection the host processor wishes to have rendered. It also generates object screen subsection render command mask data for rendering commands for the object indicating which screen sections that the object would be displayed in one of the plurality of subsections.

The CPU stores a stream of command packets identifying the plurality of rendering commands and their associated object screen subsection render command mask data. The screen subsection display mask data packet would be set by the CPU prior to the rendering of the stream of command packets so they may be rendered to the appropriate screen subsection. In one example, the associated object screen subsection render command mask data is provided for objects that are to be displayed in multiple different subsections on the screen such that the command buffer may be used for storing the rendering commands which are used to draw to multiple different subsections on the screen.

The graphics processor 12 executes only those commands whose associated object screen subsection render command mask data indicates that the object rendered from that command would be displayed in the same screen subsection identified by the stored screen subsection display mask data that is stored, for example, after receipt of the corresponding packet that included the screen subsection display mask data.

The CPU does not need to rearrange its commands in the command buffer or its command list. It merely indicates which screen subsection it intends to render and provides information indicating the screen subsections that the objects would be displayed in. The graphics processor then determines which commands should be executed since they would produce objects that are displayed in the display subsection that the host processor wants rendered.

FIG. 2 is a block diagram illustrating in more detail an apparatus 200 for providing rendering of subsections of screen space. In this example, rendering commands may be in the form of packets, which may include headers that have a bit indicating whether or not the command can be a predicated rendering command. This data is indicated data 202. In one embodiment, a drawing command is stored in a command buffer 204 by the host processor may also include display subsection mask bits 206, such as the object screen subsection render command mask data. The host processor 14 also issues the screen subsection display mask packet 208 to notify the graphics processor 12 which screen section the host processor wants to have rendered. Alternatively, the host processor issues an object screen subsection mask packet 210 for those commands that allow predicated rendering and for those commands associated with given objects while rendering given objects. As such, each object has their associated commands identified by indicating which subsection the object will be rendered in, and hence, the associated rendering commands.

As shown, the graphics processor includes a rendering engine 212, as is known in the art, that receives rendering commands 214 to render objects for display on the display 16. The rendering engine 212 also provides the screen extents 213, as previously described, in a first pass rendering process.

The graphics processor also includes a command processor 216 with screen subsection command discard logic 218 and may include registers 220 and a command prefetcher 222. The registers 220 store the object screen subsection mask data 222 that was communicated in the object screen subsection mask packet 210. Another register stores the screen subsection display mask data 224 that was communicated in the screen subsection display mask packet 208.

FIG. 3 is a flowchart illustrating, for example, a method for providing rendering of subsections of screen space carried out, for example, by the graphics processor 12 or any other suitable circuit or device. As shown, the method includes receiving rendering commands associated with different screen subsections, such as rendering commands associated with different objects. This is shown in block 300. As shown in block 302, the method includes determining which screen section is currently being rendered by a rendering engine. This may be done, for example, by the command processor 216 looking at the screen subsection display mask data 224 to determine which screen subsection the CPU wants rendered. As such, this includes evaluating the screen section mask bits 206 and in this case the screen subsection display mask data 224. The method includes not executing a fetched command if it is determined that the fetched command is not associated with a current screen section being rendered. This is determined, for example, by comparing the object screen subsection mask data 222 associated with a given object and hence a group of commands, and determining if that data indicates that the object is drawn in the same subsection indicated in the screen subsection display mask data 224. If the comparison of the mask bits indicates that the command associated with a given object being rendered is associated with an object that one would be rendered in the same screen subsection identified in the screen subsection display mask, then the command is executed, otherwise the command is discarded. The process then continues for all fetched commands. It will be recognized that the operations described above or below may be performed in any suitable order.

As shown in FIG. 4, a method of providing rendering of subsections of the screen space includes, as shown in block 400, storing received screen subsection display mask data in memory, such as receiving the screen subsection display mask packet 208 indicating the subsection of the screen that the host processor is currently rendering and storing the information in the screen subsection display mask register 224. As shown in block 402 the method includes fetching a group of stored rendering commands such as a group of packets, such as by prefetcher 222 and associated object screen subsection rendering mask data from a command buffer, such as command buffer 204. By way of example, a group of packets may be associated for a given object and may include the subsection mask bits 206, which may also be communicated as part of a separate packet, namely the object screen subsection mask packet 210. Accordingly, FIG. 2 shows differing embodiments where the object screen subsection mask bits are included on a per command basis or where the object screen subsection mask packet 210 is sent and subsequent packets are then associated with that packet until another such packet is sent. However, it will be recognized that any suitable designation technique may be used. As shown in step 404, the method includes storing received object screen subsection render command mask data in memory. This may be done, for example, by the command processor 216. When the prefetcher 222 fetches the object screen subsection mask packet 210, the mask data is then stored in the object screen subsection mask 222.

As shown in block 406, the method includes discarding those fetched commands whose associated object screen subsection render command mask data do not correspond to the stored screen subsection display mask data. As such the command processor 216 executes only those commands whose associated object screen subsection rendered command mask data corresponds to screen a subsection that is identified by the stored screen subsection display mask data as being the current subsection of the screen being rendered. The method continues for all packets of interest.

As such as described in one embodiment, the object screen subsection mask bits for packet 210 may be associated with other packets, either by their mere ordering or by any other suitable linking. Alternatively, the same mask information may be placed in the drawing packet itself, if desired. In addition, the methods include determining whether such command is a predicated rendering command and if so, then checking that particular command against the screen subsection display mask 224.

As such, among other advantages, the host processor need not organize packets of commands in any particular order to effect binning of rendering commands so that a particular screen subsection is rendered when needed by the host processor. Other advantages will be recognized by those of ordinary skill in the art.

Below is another way of describing the method and apparatus for providing rendering of subsections of screen space.

Predicated packet support allows Type-3 packets to be discarded from the command stream that fail the bin compare test. All Type-3 packets with bit 0 set in their header will be tested against the Bin registers (if bit 0 is cleared the packet will proceed without the test). If the test passes, the packet will proceed through the CP for processing, otherwise it will be discarded if the test fails.

The test is setup by the drivers via 2 packets. There are BIN_MASK_HI & BIN_MASK_LO registers that represents the current driver defined bin category and are set by the SET_BIN_MASK packet. There are also a BIN_SELECT_HI & BIN_SELECT_LO registers that represents the bin category of the subsequent command stream data and are updated by the SET_BIN_SELECT packet. Once these registers are set, the CP can then compares the Bin registers for subsequent predicated Type-3 packets.

SET_BIN_MASK

Used with SET_BIN_SELECT packet to setup the predication test.

The SET_BIN_MASK packet sets two consecutive 32-bit registers CP_BIN_MASK_LO and CP_BIN_MASK_HI. The combined 64-bit value specifies the current driver defined bin category.

The CP's Prefetch Parser compares the CP_BIN_MASK and CP_BIN_SELECT registers to determine whether subsequent predicated packets are processed.

The comparison tests consists of a bitwise AND operation followed by an OR reduce operation on the result to detect if any of the bits are set.

If any bits are set, the predicated packet is processed; otherwise the predicated packet is skipped.

Format
Ordinal
Field Name
Description
1
[HEADER]
Header of the packet
2
[BIN_MASK_LO]
Set BIN_MASK_LO[31:0] register to value supplied.
3
[BIN_MASK_HI]
Set BIN_MASK_HI[31:0] register to value supplied.
SET_BIN_SELECT
Used with SET_BIN_MASK packet to setup the predication test.

The SET_BIN_SELECT packet sets two consecutive 32-bit registers CP_BIN_SELECT_LO and CP_BIN_SELECT_HI. The combined 64-bit value specifies the bin category of the subsequent command stream data.

The CP's Prefetch Parser compares the CP_BIN_MASK and CP_BIN_SELECT registers to determine whether subsequent predicated packets are processed.

The comparison test consists of a bitwise AND operation followed by an OR reduce operation on the result to detect if any of the bits are set.

If any bits are set, the predicated packet is processed; otherwise the predicated packet is skipped.

Format
Ordinal
Field Name
Description
1
[HEADER]
Header of the packet
2
[BIN_SELECT_LO]
Set BIN_SELECT_LO[31:0] register to value supplied.
3
BIN_SELECT_HI]
Set BIN_SELECT_HI[31:0] register to value supplied.

The above detailed description of the invention and the examples described therein have been presented for the purposes of illustration and description only and not by limitation. Also, the word "coupled" means directly or indirectly coupled to facilitate operation of the circuit. It is therefore contemplated that the present invention cover any and all modifications, variations or equivalents that fall within the spirit and scope of the basic underlying principles disclosed above and claimed herein.

What is claimed is:

1. A method for providing rendering of subsections of a screen space comprising:
   storing received screen subsection display mask data in memory identifying a screen subsection that is to be rendered;
   fetching a group of stored rendering commands and associated object screen subsection rendering mask data from a command buffer, wherein at least a plurality of the fetched rendering commands indicate that they are predicated rendering commands;
   storing the object screen subsection render command mask data associated with a given object in memory, the object screen subsection render command mask data indicating which screen subsections that the object is displayed in the plurality of subsections; and
   discarding those fetched rendering commands whose associated object screen subsection render command mask data does not correspond to the screen subsection identified by the stored screen subsection display mask data, wherein the discarding comprises determining, on a per command basis, whether predicated rendering identification information in the command indicates that the command is a predicated rendering command and if so, then checking the command against the screen subsection display mask data.

2. The method of claim 1 wherein the received object screen subsection render command mask data is received from a first processor and wherein discarding those fetched commands whose associated object screen subsection render command mask data, is performed by a second processor.

3. A graphics processor comprising:
   a rendering engine operative to render objects for multiple screen subsections;
   a command processor, operatively coupled to the rendering engine, the command processor comprising:
      screen subsection command discard logic operative to obtain received object screen subsection render command mask data associated with a given object and received screen subsection display mask data, the object screen subsection render command mask data indicating which screen subsections that the object is displayed in the plurality of subsections, the screen subsection display mask data identifying one of the multiple screen subsections that is to be rendered, and operative to discard fetched commands whose associated object screen subsection render command mask data does not correspond to the screen subsection identified by the screen subsection display mask data, wherein at least a plurality of the fetched commands indicate that they are predicated rendering commands, and wherein the screen subsection command discard logic is operative to determine, on a per command basis, whether predicated rendering identification information in the command indicates that the command is a predicated rendering command and if so, then check the command against the screen subsection display mask data in order to discard the fetched commands whose associated object screen subsection render command mask data does not correspond to the screen subsection identified by the screen subsection display mask data; and
   wherein the rendering engine renders objects based on fetched commands that are not discarded.

4. Apparatus for providing rendering of subsections of a screen space comprising:
   a first processor;
   a display device operative to display display information;
   a second processor, operatively coupled to the display device and operatively coupled to the first processor;
   wherein the first processor is operative to provide rendering commands associated with different screen subsections and to store rendering commands and associated object screen subsection render command mask data in a command buffer, wherein at least a plurality of the rendering commands indicate that they are predicated rendering commands; and
   wherein the second processor is operative to render objects for multiple screen subsections based on the object screen subsection render command mask data, the object screen subsection render command mask data indicating which screen subsections that the objects are displayed in the multiple screen subsections, and to store received screen subsection display mask data in memory, the screen subsection display mask data identifying one of the multiple screen subsections that is to be rendered; fetch a group of stored rendering commands and associated object screen subsection render command mask data from a command buffer; store received object screen subsection render command mask data in memory; and
   discard those fetched commands whose associated object screen subsection render command mask data does not correspond to the screen subsection identified by the stored screen subsection display mask data, wherein the second processor is operative to determine, on a per command basis, whether predicated rendering identification information in the command indicates that the command is a predicated rendering command and if so, then check the command against the screen subjection display mask data in order to discard those fetched commands whose associated object screen subsection render command mask data does not correspond to the screen subsection identified by the stored screen subsection display mask data.

5. An apparatus that renders a screen space comprising:
   a processor operative to evaluate screen subsection data associated with a received rendering command that identifies a screen subsection from a plurality of screen subsections for which the received rendering command refers to determine whether to execute the received rendering command,
   execute the received rendering command if the received rendering command is associated with an object to be displayed in a current screen subsection being rendered, wherein screen subsection display mask data indicates the current screen subsection being rendered, and
   populate a command buffer with rendering commands for the plurality of screen subsections wherein at least a plurality of the populated commands indicate that they are predicated rendering commands, wherein the processor is operative to determine, on a per command basis, whether predicated rendering identification information in the command indicates that the command is a predicated rendering command and if so, then check the command against the screen subsection display mask data.

6. In a system that renders a screen space, a method comprising:
   evaluating, by a graphics processor that renders a plurality of screen subsections, screen subsection data that identifies a screen subsection for which one or more received rendering commands refer to determine whether to execute or discard the one or more received rendering commands;

executing, by the graphics processor, the one or more received rendering commands if the one or more received rendering commands correspond to an object to be displayed in a current screen subsection being rendered otherwise discarding the one or more rendering commands; and populating a command buffer with rendering commands for a plurality of different screen subsections wherein at least a plurality of the populated commands indicate that they are predicated rendering commands wherein evaluating comprises determining, on a per command basis, whether predicated rendering identification information in the command indicates that a command is a predicated rendering command and if so, then checking the command against the screen subsection data.

\* \* \* \* \*